(12) United States Patent
Führer

(10) Patent No.: US 10,125,001 B2
(45) Date of Patent: Nov. 13, 2018

(54) METHOD FOR MONITORING AND CONTROLLING A FILLING SYSTEM, AND DEVICE FOR CARRYING OUT SAID METHOD

(71) Applicant: KRONES AG, Neutraubling (DE)

(72) Inventor: Kaj Führer, Neutraubling (DE)

(73) Assignee: KRONES AG, Neutraubling (DE)

( * ) Notice: Subject to any disclaimer, the term of this patent is extended or adjusted under 35 U.S.C. 154(b) by 8 days.

(21) Appl. No.: 14/784,179

(22) PCT Filed: Mar. 19, 2014

(86) PCT No.: PCT/EP2014/055467
§ 371 (c)(1),
(2) Date: Oct. 13, 2015

(87) PCT Pub. No.: WO2014/170079
PCT Pub. Date: Oct. 23, 2014

(65) Prior Publication Data
US 2016/0052764 A1 Feb. 25, 2016

(30) Foreign Application Priority Data

Apr. 19, 2013 (DE) .......... 10 2013 207 139

(51) Int. Cl.
*B67C 3/00* (2006.01)
*G06T 7/00* (2017.01)
(Continued)

(52) U.S. Cl.
CPC ............ *B67C 3/007* (2013.01); *G06K 9/52* (2013.01); *G06K 9/6267* (2013.01);
(Continued)

(58) Field of Classification Search
CPC ............ B67C 3/007; G06T 7/215; G06T 7/10
(Continued)

(56) References Cited

U.S. PATENT DOCUMENTS

2005/0275747 A1* 12/2005 Nayar .................. H04N 5/2355
348/362
2006/0153452 A1* 7/2006 Kjeldsen ............... G06T 3/4053
382/176
(Continued)

FOREIGN PATENT DOCUMENTS

CN 101641280 A 2/2010
CN 103049758 A 4/2013
(Continued)

OTHER PUBLICATIONS

Daode Zhang et al., "Online Detection of Beer Bottle Based on Optical Flow Field Segmentation and SUSAN Algorithm", Image and Signal Processing, 2008. pp. 165-169, XP031286851, ISBN: 978-0-7695-3119-9, May 27, 2008.*
(Continued)

*Primary Examiner* — Jeffery A Williams
(74) *Attorney, Agent, or Firm* — Marshall, Gerstein & Borun LLP

(57) ABSTRACT

Method for controlling a filling system for liquid or solid products, particularly food industry products, including a method for analyzing a dynamic state of the filling system including the method steps: acquisition of image sequences in at least one portion of the filling system, and evaluation of the image sequences by calculating an optical flow from an image sequence of a given number of frames; evaluating the optical flow; and outputting control signals for the filling system when the evaluation of the optical flow announces or indicates a deviation from a normal operating state.

19 Claims, 2 Drawing Sheets

Figure 1:
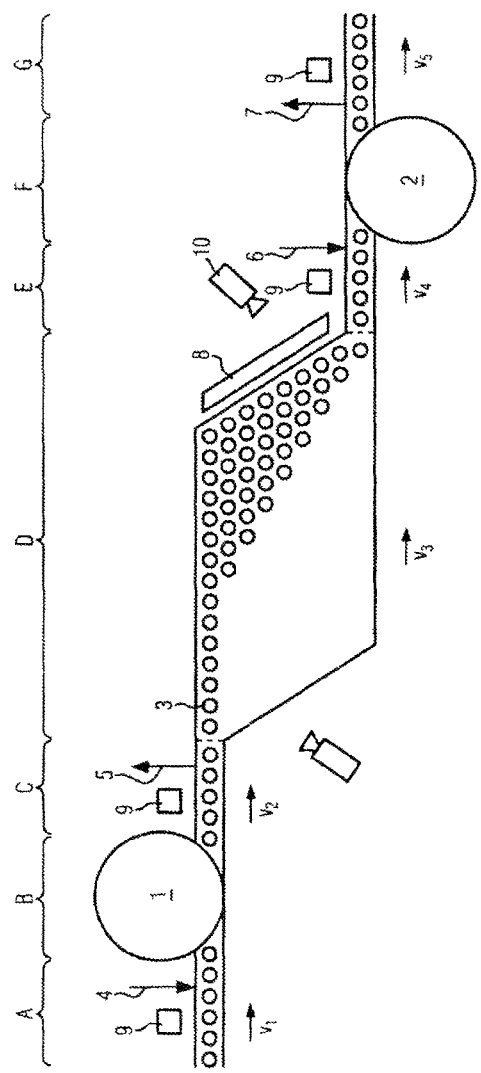

(51) Int. Cl.
G06K 9/52 (2006.01)
G06K 9/62 (2006.01)
G06T 7/20 (2017.01)
G06T 7/60 (2017.01)
H04N 7/18 (2006.01)
G06T 7/10 (2017.01)
G06T 7/215 (2017.01)
G06T 7/194 (2017.01)
G06K 9/46 (2006.01)

(52) U.S. Cl.
CPC ............. *G06T 7/0004* (2013.01); *G06T 7/10* (2017.01); *G06T 7/194* (2017.01); *G06T 7/20* (2013.01); *G06T 7/215* (2017.01); *G06T 7/60* (2013.01); *H04N 7/18* (2013.01); *G06K 2009/4666* (2013.01); *G06T 2207/20021* (2013.01)

(58) Field of Classification Search
USPC .......................................... 348/143
See application file for complete search history.

(56) References Cited

U.S. PATENT DOCUMENTS

| | | | | |
|---|---|---|---|---|
| 2007/0289536 | A1* | 12/2007 | Dunn | A01J 5/01 119/14.14 |
| 2010/0006396 | A1 | 1/2010 | Schmid | |
| 2010/0059589 | A1 | 3/2010 | Goncalves et al. | |
| 2010/0158310 | A1 | 6/2010 | McQueen et al. | |
| 2011/0255746 | A1* | 10/2011 | Berkovich | G06F 17/30247 382/103 |
| 2013/0182890 | A1* | 7/2013 | Shehata | G06T 7/0008 382/103 |

FOREIGN PATENT DOCUMENTS

| | | |
|---|---|---|
| DE | 3607858 A1 | 9/1987 |
| DE | 3616023 A1 | 11/1987 |
| DE | 102007014802 A1 | 10/2008 |
| DE | 202008009166 U1 | 10/2008 |
| DE | 102010021733 A1 | 12/2011 |
| EP | 2455914 A1 | 5/2012 |
| EP | 2083209 B1 | 10/2012 |
| JP | 09185710 A * | 7/1997 |

OTHER PUBLICATIONS

Notification of the First Office Action for Chinese appliction No. 201480022264.5, The State Intellectual Property Office of P.R. China, dated Mar. 3, 2017.

Online Detection of Beer Bottle Based on Optical Flow Field Segmentation and Susan Algorithm, Daode Zhang, et al.., 2008 Congress on Image and Signal Processing, pp. 165-169, May 30, 2008.

International Search Report for PCT/EP2014/055467, dated Jul. 1, 2014.

Search Report for DE 10 2013 207 139.6, dated Jun. 6, 2013.

Baker, S.; Kanade, T.: Super-Resolution Optical Flow; Techreprt CMU-RI-TR-99-36, 1999.

Notification of the Second Office Action for Application No. 201480022264.5, The State Intellectual Property Office of P.R. China, dated Oct. 17, 2017.

* cited by examiner

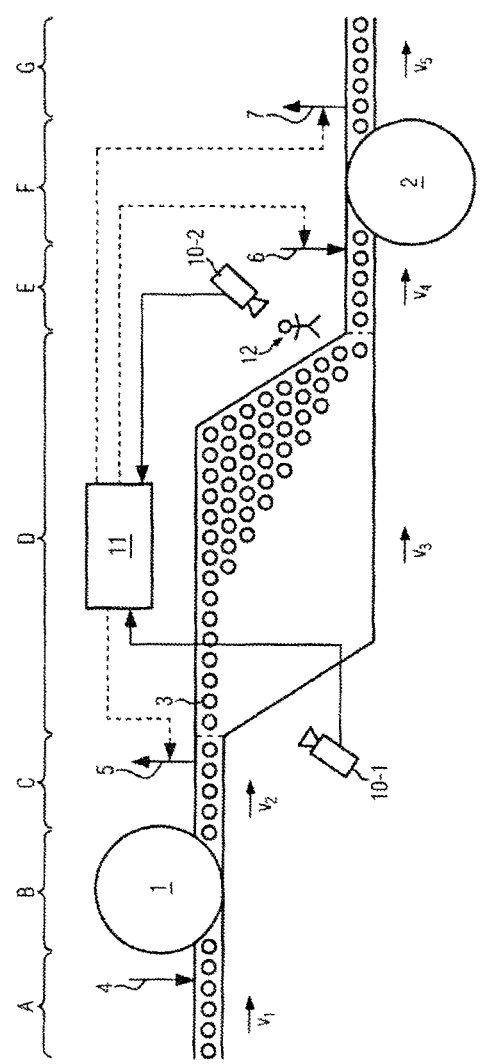

METHOD FOR MONITORING AND CONTROLLING A FILLING SYSTEM, AND DEVICE FOR CARRYING OUT SAID METHOD

CROSS-REFERENCE TO RELATED APPLICATION

The present application is the United States national phase of International Patent Application No. PCT/EP2014/055467, filed Mar. 19, 2014, which application claims to European Application No. 10 2013 207 139.6, filed Apr. 19, 2013. The priority application is hereby incorporated by reference.

FIELD OF THE DISCLOSURE

The present disclosure generally relates to controlling a filling system for liquid or solid products, especially food industry products, and to a method for analyzing a dynamic state of a filling system, a method for controlling a filling system, and a device for carrying out the method.

BACKGROUND

Filling systems are complex technical structures comprising a plurality of units for different tasks in a filling process, which tasks must be coordinated to achieve the highest possible productivity, i.e. the filling system should finish the highest possible number of filled or bottled containers per unit of time.

Typically, a filling system includes a plurality of units connected to one another by conveyors on which containers are transported between said units. The units can be bottle fillers, depalletizers, unpacking, cleaning, labeling, printing, packing machines, palletizers, stretch blow molding plants for manufacturing containers of thermoplastic resin, etc. The transport of containers between the units is of major importance. Here, chain conveyors, air conveyors for empty PET bottles, transport stars and devices for feeding and discharging containers are used, for example. Single- and multi-strand transportation routes are being used on the conveyor lines. Since the containers are serially inserted into the units, multi-strand transport streams have to be separated into individual streams. The multi-strand transportation routes serve as buffer zones, to compensate for fluctuations during production. Such filling systems are described, for example, in patent specifications DE 10 2010 021733 A and DE 10 2007 014802 A. A general description of filling systems can also be found in the final report of the research project "Simulationsgestützte Planung und Nutzung von Getränke-Abfüllanlagen" (project no. 12265-N) which was conducted between Dec. 1, 1999 and Aug. 31, 2001 at the Institute for Materials Handling, Material Flow, Logistics of the Technical University of Munich.

It is one aspect of such a filling system to fill the largest possible number of containers, such as bottles, in the shortest possible time, e.g. with a beverage, while maintaining consistent quality which corresponds at least to the legally prescribed quality standards and hygiene regulations. To ensure this, a system control is required for evaluating data from a plurality of sensors in order to ensure a smooth process, i.e. to detect any malfunctions or disturbances in time and to adapt the system processes correspondingly.

FIG. 1 is an exemplary view of a section of a filling system including two units 1 and 2 which are connected with one another by means of a corresponding conveyor. The section of the conveyor shown in FIG. 1 can be divided into seven portions, wherein the containers 3 in portions B and F are handled by units 1 and 2. For example, unit 1 can be a filling device for containers 3 e.g. for filling bottles with a beverage, and unit 2 can be, for example, a container labeling device for labeling the filled containers. The portions A, C, D, E and G are portions where the containers, such as bottles, are transported. In portion A, bottles are transported to unit 1, e.g. a sterilizing device. In portion C, the containers treated in unit 1 are carried away. The subsequently following portion D serves as a transport buffer where, for example, the single-strand of portion C can be divided into several parallel transport strands or lines. The buffer zone is particularly used to buffer malfunctions of the units located in front and subsequently following. Since the capacity of a filling system is designed with regard to the filler, the buffer is designed in such a manner that sufficient containers are always provided in the buffer to allow the filler to operate continuously, even in case of malfunctions occurring in other components. In portion E, the multi-strand transport route is again separated in buffer portion D and supplied to unit 2. In portion G, the containers treated in unit 2, such as labeled bottles, are carried away and fed to a subsequently following unit, e.g. a printing machine. The transport routes may also include additional feeding means 4 and 6 as well as discharging means 5 and 7. The positioning of both feeding means 4 and 6 and discharging means 5 and 7 according to FIG. 1 is just exemplary and may differ depending on the system's design. For example, the sensors downstream of the units may check, whether the containers are clean or correctly filled and, if a container does not meet the quality standards, it can be removed from the transport stream via the discharging means 5 and 7. Said discharging means may also serve to divert or branch off container streams, for instance when several filling lines of a filling system are arranged in parallel. In case of malfunction of a filling line, e.g. when a container cleaning unit in a line shuts down, a container stream can be diverted, e.g. in order to fill an adjacent buffer. This is done via feeding means 4 and 6. Such parallel filling system has been described, for example, in DE 10 2010 021733 A1. The conveying speeds v1, v2, v3, v4 and v5 in the respective conveyor portions A, C, D, E and G are set in such a manner that a steady state prevails in the production. "Steady state in the production" means that loading and throughput of containers, i.e. also the output of filled containers per unit time, is constant (steady). In case of any malfunction, e.g. when unit 1 (for instance a filling means) stops, or when there is a container jam, for example due to a fallen container, the throughput of the containers or bottles changes at the respective location in the system. Owing to the buffer routes as shown e.g. in FIG. 1 in portion D, any malfunction may temporarily be buffered so that output of filled containers will not be affected for the moment. Hence, it is known from the state of the art that monitoring of the loading of the buffer routes is an effective measure to enable a trouble-free production.

FIG. 1 shows examples for sensor arrangements suitable, according to the state of the art, for monitoring the conveyor belts. Reference number 8 shows a dynamic pressure sensor used to monitor the loading of a buffer. Such a dynamic pressure sensor in the form of jam switches is described, for example, in DE 3 607 858 A or DE 3 616 023 A.

Reference number 9 denotes a non-contact measurement technology known from the prior art for detecting the loading of conveying means, for instance light sensors or light barriers. The use of light sensors in a transport device for feeding articles to a packaging machine is disclosed in utility model DE 20 2008 009166 U1. According to the DE 10 2010 021733 A, a light barrier is disclosed enabling the row of containers being buffered in the transfer route to connect to those containers that are still in the conveyor line without leaving a gap when the filling station was restarted. This type of sensor systems is disadvantageous in that they provide just little information on the state of the transport means and the transported containers and that the future state of the plant cannot or hardly be estimated. For a smooth or trouble-free production, more information is required, particularly for complex systems.

As further known from the state of the art, the sensor technology can be supplemented with image evaluation methods so that the state of the transport means can be detected better.

Reference number 10 of FIG. 1 designates e.g. video cameras for monitoring the conveyor system.

There is, for instance, a commercial camera-based system for the non-contact counting of containers while being transported in a throng of the Werner Nophut GmbH titled "Zählsystem DKAM-28HD". Said counting system recognizes and counts glass bottles arbitrarily arranged on a conveyor belt. Furthermore, said system is able to recognize whether the bottles are open or closed.

A further development of such a camera-based system for monitoring, controlling and optimizing filling systems for food, in particular beverage bottles, is described in DE 10 2007 014802 A. That method uses an optoelectronic recognition system having at least one electronic camera in conjunction with one downstream computer-based image processing unit. Image processing is used to obtain information on the objects to be seen on the image from the acquired images to determine an operating state of at least one portion of the entire system. Object recognition is done, for example, in accordance with the probing method with subsequently following contour comparison which may be followed by feature recognition. The system may also be used to recognize incorrectly positioned containers, e.g. containers that have topped over. The inflow behavior to the respective systems may also be monitored, e.g. from temporary buffers.

It is a disadvantage of this state of the art that image processing is merely based on the principle of object recognition according to the probing method with subsequently following contour comparison. To do so, each image has to be analyzed individually, each image just reflecting a snapshot of an operating state. To describe the dynamic behavior of the production plant, a single image analysis will not suffice. Further evaluation steps of the individual snapshots which have not been described in detail in the prior art will have to follow. Since each image is first evaluated individually, there is an enormous expenditure of time. It is, therefore, avoided to analyze a plurality of individual images. Hence, the operation will not be intervened until a critical threshold e.g. for the density of the recognized objects at a certain location in the system is reached, i.e. a threshold is either exceeded or gone below.

It is, therefore, desirable to obtain a method for analyzing the dynamic state of a filling system so as to control the system in advance in a better manner. It would also be desirable to have quality features mapped in the filling process.

SUMMARY OF THE INVENTION

It is therefore one aspect of the present disclosure to provide a method for improving the control of complex filling systems and particularly for enabling fully automatic control without human intervention.

In particular, this is solved by a method for analyzing a dynamic state of a filling system for liquid or solid products, especially for food industry products, comprising the following method steps: acquisition of image sequences in at least one portion of the filling system, and evaluation of the image sequences by calculating an optical flow from an image sequence of a given number of frames.

The optical flow is calculated from an image sequence and can be visualized as speed vectors projected into the image plane of objects contained in an image. Thus, the optical flow serves to represent motion information and enables recognition of the three-dimensional structure of scenes for estimating movements in space and for recognizing individually moved objects which is called "segmentation". The optical flow does not only include static information, i.e. position and type of objects in space at a given moment of time, but also motion information, i.e. the future position of objects. Accordingly, the optical flow also includes dynamic information of the image contents or objects. Owing to the optical flow, future states of motion on a conveyor belt or route can be estimated so that measures can be taken at an early stage to prevent malfunctions. Moreover, the optical flow can be used to illustrate objects to be monitored with a high resolution so that quality criteria can be examined more exactly.

According to one embodiment, the optical flow is calculated by means of differential methods, preferably according to the Lucas-Kanade-method or to the Horn-Schunck-method. With these methods, a vector field is calculated from the image sequence of the given number of frames, each vector indicating a direction of motion and a speed of motion of an image point or a pixel block of the image sequence.

According to one embodiment, the method uses the optical flow for the segmentation of images with regard to image contents. For instance, such segmentation can be done with regard to the foreground or the background motion, to individual objects or to patterns of movement.

According to a particular embodiment, the optical flow is used to separate the foreground and the background motion. This can be used, e.g. in filling systems to avoid accidents. For instance, an emergency stop can be triggered when a pattern of motion is detected in a machine monitored by means of an optical flow (e.g. a stretch blow molding machine), thus indicating hazard of operating personnel while the system is running.

According to yet another embodiment, the optical flow is used to identify moving objects. Thus, e.g. the loading density on conveyor belts and buffer routes may be determined at a given moment of time. Moreover, the optical flow contains the information indicating how the loading density on the belts and the buffer route develops over a given period of time. Thus, the optical flow serves to estimate the future loading of the conveyor belts. In this connection, identifying moving objects is not limited to the containers but may also include human beings, human body parts, obstacles, debris and/or contaminants in the conveying region and its surroundings.

In certain cases, frames do not have the desired resolution to perform subsequent analyses, e.g. to identify containers in an inspector. By means of the optical flow, several frames of a video sequence can be combined to form an image with a higher resolution, or image segments of identified, moving objects with a higher resolution can be calculated. In particular, the identified object, e.g. a bottle, a glass, or a can, can be analyzed with regard to the question whether quality criteria have been met. For instance, containers or the contents thereof may be analyzed with regard to the filling quality, damages or foreign matter.

According to one embodiment, the optical flow is continuously recalculated from each image newly acquired by the video camera. This method can be used to continuously determine whether there is a steady state of motion or whether the state of motion on the conveyor means changes dynamically. Alternatively, the optical flow can be recalculated with a new image sequence at given time intervals. This variant makes lower demands on the image evaluation computer but is disadvantageous in that less information for estimating the motion is available. Thus, said variant is advantageous in less time-critical regions of the filling plant.

Additional information on the development of the dynamic state can be obtained when the optical flow is extrapolated on the basis of changes between successively following calculated optical flows.

According to one embodiment, the method further comprises the following method steps: comparing the currently calculated optical flow or the extrapolated optical flow with optical flows stored in either a database, an expert system or a neural network; determining whether the currently calculated optical flow deviates from the stored optical flows by less than a given value; and outputting a control signal when the given value is undergone.

By comparing the currently optical flow with figures based on experience in a database, an expert system or a neural network it can be decided very quickly and easily whether the current optical flow and, thus, the current dynamic state of the conveyor means is in the normal range or will end up in a malfunction.

In this connection, the stored optical flows can define critical conveying process states. For instance, a conveying state can be mapped to an optical flow in a learning process, said flow corresponding to a conveying speed that is either too slow or too fast. Such critical conveying process state may also be a hazard for the operating personnel or the product quality (dirt, insufficient charging, damaged containers, etc.).

According to another aspect of the present disclosure, a method for controlling a filling system for liquid or solid products, particularly for food industry products, is provided which makes use of the method of analyzing a dynamic state of the filling system as described above. In particular, the method comprises the following steps: acquisition of image sequences in at least one portion of the filling system, and evaluation of the image sequences by calculating an optical flow from an image sequence of a given number of frames; rating of the calculated optical flow by means of stored optical flows including judging whether a critical situation is evolving or not; and intervention in the process control when the evaluation shows that a critical state is evolving.

Using the auxiliary means "optical flow" in the system control helps to improve the system's safety and the quality of inspection.

The above-mentioned aspect is also solved by a device for analyzing a dynamic state of a filling system for liquid or solid products, particularly food industry products, the device comprising the following: an image acquisition device; and an image data processing device. The device is characterized in that the image data processing device is designed to calculate an optical flow from an image sequence of a given number of frames. The device further comprises a means for evaluating the optical flow in terms of whether there are or have to be expected any malfunctions or disturbances in the conveying process, or whether the quality characteristics of the containers in the monitoring area of said at least one image acquisition device are met. This may happen, for example, by designing the image data processing device so that it may compare the calculated optical flow with optical flows stored in a knowledge base imaging known conveying process states, in order to judge or evaluate the conveying state imaged in said optical flow and, if necessary, to take countermeasures against a looming malfunction.

Embodiments, developments, advantages and possibilities of application of the disclosure will be explained in detail below. All of the described and/or illustrated features principally are, either alone or in any combination, subjects of the disclosure, regardless of their summary in the claims or their dependency. The content of the claims is also part of the description.

In the figures,

FIG. 1 schematically shows a section of a filling system according to the prior art; and FIG. 2 schematically shows a section of a filling system according to the present disclosure.

DETAILED DESCRIPTION

The present disclosure was effected in order to improve the control of filling systems for liquid or solid products, particularly for food industry products. It is particularly intended to improve the system's safety and the quality of inspection of the filled products. By improving the system's control, a higher level of automation with less intervention required by the staff shall be achieved, thus reducing the contamination in filling systems under clean room conditions.

It is particularly intended to improve monitoring of filling systems on the basis of video monitoring. Starting from the frame processing of monitoring video images according to the state of the art, the present disclosure aims to improve the motion detection in image sequences. When the differences of image contents in image sequences are known, such information can be used inter alia for motion detection, motion tracking, motion recognition, image segmentation, 3D reconstruction, object recognition and to increase the resolution of recognized objects (super resolution). The estimated motion fields may then be used to analyze certain motions, it is, for example, possible to detect abnormal behavior by means of motion fields. According to the disclosure, motion detection according to the principle of the optical flow is used. According to Wikipedia, a vector field is called optical flow in image processing and in optical metrology, said field indicating the direction of motion and the speed of motion for each pixel of an image sequence. The optical flow can be understood as speed vectors of visible objects projected onto the image plane. The optical flow is an important illustration of motion information. It forms the basis for recognizing the three-dimensional structure of scenes in order to evaluate motions in space and for recognizing individually moved objects (segmentation). The classical optical flow is determined by means of a differential method, i.e. on the basis of derivatives and gradients of the gray-scale signal and provide a dense motion field or vector field. The basic differential method was developed by Berthold Horn and Brian Schunck and assumes that the brightness E is constant at respective locations of the frames in the image sequence. Then follows from the derivative $$\frac{dE}{dt} = \frac{\partial E}{\partial t} + \frac{\partial E}{\partial x} \cdot \frac{dx}{dt} + \frac{\partial E}{\partial y} \cdot \frac{dy}{dt},$$

as a necessary condition, the equation for determining the speeds:

$$\frac{dE}{dt} + \frac{\partial E}{\partial x} \cdot \frac{dx}{dt} + \frac{\partial E}{\partial y} \cdot \frac{dy}{dt} = 0.$$

The vector field is then determined, e.g. by means of the Lucas-Kanade-method or the Horn-Schunck-method.

The optical flow enables the following applications:

Motion Detection in Real Time

The optical flow can be used for the segmentation of foreground and background motions. It may be used, e.g. in filling systems in order to avoid accidents. For instance, an emergency stop can be triggered when in case of a machine monitored by means of an optical flow (e.g. the stretch blowing machine) a motion pattern has been recognized indicating that an operator has reached into the system while running.

Super Resolution

In certain cases, images do not have the required resolution to perform subsequent analyses, e.g. for identifying containers in an inspector. The optical flow helps to combine several images of a video sequence to form an image with a higher resolution. Containers and/or the contents of containers may correspondingly be better analyzed, e.g. with regard to damages or foreign matter.

Abnormal Activity Recognition

The motion field in videos can also be used to detect abnormal motions such as a jam of bottles, play of container guiding mechanisms, problems arising when gripping by means of neck handling, vibrations, defective conveyor belt bends and fittings, etc. To do so, it is first of all required to learn normal motion patterns. Subsequently, the motions are analyzed and compared as to whether they are normal motions or not. An index indicates how unusual said motion is in the sense of a deviation from the desired motion pattern, especially in case of speed changes etc.

The present disclosure is intended for the use in a filling system for liquid or solid products, particularly food industry products.

FIG. 2 shows the use of the present disclosure in a section of a filling system. Any reference numbers of FIG. 2 being identical to reference numbers in FIG. 1 donate the same features. The description of said features according to the introductory part of the description with regard to FIG. 1 also applies to FIG. 2. The present disclosure requires at least one camera provided in a region between two treatment units 1 and 2. For instance, a first camera 10-1 can monitor a discharge area of a filling system 1 and a second camera 10-2 can monitor a buffer area and a feed area for a printing machine 2 for printing filled containers 3. However, the type of units 1 and 2 is unimportant for the use of the application and may be replaced by other types, e.g. by a stretch blowing machine and a subsequently following sterilization unit. The signals from cameras 10-1 and 10-2 are transmitted to an evaluating means 11. The evaluating means 11 calculates the optical flow e.g. for ten subsequently following video images. Evaluating the optical flow for the regions C according to camera 10-1 and for the regions D and E according to camera 10-2 can be done in accordance with different criteria. For instance, the optical flow from camera 10-1 can be used to check the filling result of filling means 1. To do so, segmentation of the motion information in the data to the optical flow is carried out e.g. with regard to objects at the same speed and in the same direction. Once said objects have been identified and isolated, an image with a higher resolution can be generated for each recognized object from a number of successively following images, and it can be determined by means of feature extraction whether the filling level is correct or whether there are any other features e.g. within a desired range of parameters, for instance the structure and the color of the filled bottles or the integrity of the containers. If such quality criterion has not been reached for a feature, the evaluation means 11, for example, can output a signal to actuate a discharging means 5 for removing the container that does not meet the requirements from the transport device.

During segmentation patterns may also be separated which correspond to an operator 12 entering the image field of camera 10-1. The motion information (direction and speed of motion) will then be used to judge whether there is any hazard for person 12 so that an emergency stop can be actuated, if necessary, for said portion of the machine by means of evaluation means 11.

The optical flow of camera 10-2 may be used, for example, to calculate a loading density of buffer section D and to estimate whether the loading density changes. In case of any disturbance or malfunction, e.g. of filling device 1, buffer section D will gradually be cleared. This is recognized by evaluation means 11 and if the disturbance in filling means 1 continues and the loading density of buffer section D goes under a given value, evaluation means 11 can take corrective measures, for instance with regard to the printing process of printing machine 2, such that the print throughput is reduced. Another possibility of taking corrective measures might be in that the evaluation/control unit 11 actuates a feeding means 6 and, correspondingly, a discharging means provided in a parallel production branch (not shown) in order to divert filled containers from the parallel production branch to the printer so that the production process is not interrupted.

The loading density can easily be determined by separating and counting moving objects. In this case, it can also be determined by means of pattern recognition algorithms whether containers (bottles) are in an incorrect position or have topped over and may cause malfunction of the transport. If so, evaluation means 11 may instruct the machine control to remove such fallen bottles from the transport means at correspondingly provided discharge points.

Another possibility would be to compare the data of the current optical flow with stored data of optical flows. To do so, optical flows for normal motion patterns can be acquired in a learning phase. Alternatively or additionally, optical flows of disturbance situations may also be acquired. Such comparative data may be stored in a knowledge base, e.g. in a memory, or alternatively in a neural network. The advantage of a neural network is that the comparing process between a currently measured optical flow and the stored optical flow is very fast and rating of the currently measured optical flow as to whether there is any malfunction, or has to be expected in the near future, is very fast. Any deviation of the currently measured optical flow from the stored flow can be issued e.g. in the form of an index by which it can be decided whether such deviation requires corrective measures to be taken by the machine control.

The optical flow can be calculated continuously, for example. Accordingly, with each newly acquired image, a new optical flow is calculated with the last, e.g. ten, captured images. Thus, such quasi-continuous change of the optical flow serves to gain additional information, e.g. as to whether the state of motion is changing. Such information can then be interpolated so that the motion can be estimated in a better manner.

At less time-critical locations of the filling system, the optical flow may also be carried out at regular intervals by means of non-overlapping image sequences, the advantage being in that less computing power and resources are required to estimate the motion.

The invention claimed is:

1. A method for controlling a filling system configured for liquid or solid food industry products, filled in containers, comprising the following method steps:
  analyzing an operating state of the filling system by
    acquiring image sequences in at least a portion of the filling system and calculating an optical flow from an image sequence of a given number of frames, the optical flow including static and motion information of containers in the image sequence;
    evaluating of the optical flow; and
    outputting control signals for the filling system when evaluating the optical flow includes indicating a deviation from a normal operating state.

2. The method according to claim 1, and calculating a vector field from the image sequence of the given number of frames, each vector indicating a motion direction and a motion speed of a pixel or of a pixel block of the image sequence.

3. The method according to claim 1, and calculating the optical flow in accordance with either the Lucas-Kanade-method or the Horn-Schunck-method.

4. The method according to claim 1, and segmenting the images with regard to image contents by means of the optical flow.

5. The method according to claim 4, and separating foreground and background motions in the image sequence by means of the optical flow.

6. The method according to claim 4, and using the optical flow to identify moving objects.

7. The method according to claim 6, and an identified moving object is either a filling container, a human being, a human part of the body, an obstacle, a foreign matter and/or a contaminant.

8. The method according to claim 6, and combining several frames of a video sequence to form an image as a single frame with a higher resolution than the several frames individually and extracting image segments of identified, moving objects therefrom.

9. The method according to claim 6, and analyzing the identified object as to whether quality criteria are met.

10. The method according to claim 1, and continuously re-calculating the optical flow with each newly acquired image.

11. The method according to claim 1, and recalculating the optical flow at given time intervals with a new image sequence.

12. The method according to claim 10, and extrapolating the optical flow by means of the changes between subsequently calculated optical flows.

13. The method according to claim 1, wherein evaluating of the optical flow comprises:
  comparing a currently calculated or extrapolated optical flow with stored optical flows from either a database, an expert system or a neural network;
  determining whether the currently calculated optical flow deviates from the stored optical flows by less than a given value; and
  outputting the control signal when the given value is undergone.

14. The method according to claim 13, and the stored optical flows define critical conveying process states.

15. The method according to claim 14, and the critical conveying process states comprise at least one of the following:
  conveying speed too low;
  conveying speed too high;
  danger of hazard for operating personnel; and
  danger of hazard for the product quality.

16. A device for analyzing a dynamic state of a filling system configured for liquid or solid food industry products, filled in containers, the device comprising the following:
  at least one video camera;
  evaluating means designed to:
    calculate an optical flow from an image sequence of a given number of frames, the optical flow including static and motion information of containers in the image sequence; and
    evaluate the optical flow with regard as to whether there are or have to be expected malfunctions in the conveying process or whether quality characteristics of the containers in a monitoring region of the at least one video camera are met.

17. The method according to claim 9, and the object is one of a bottle, glass or can.

18. The method according to claim 1, wherein calculating the optical flow including the static information of the containers comprises calculating an optical flow including a position and type of containers in space at a given moment in time.

19. The method according to claim 1, wherein calculating the optical flow including the motion information of the containers comprises calculating an optical flow including future positions of containers.

* * * * *